Feb. 15, 1944. M. MARTINKA 2,341,638
POWER ENGINE PLANT
Filed Feb. 21, 1939   7 Sheets-Sheet 1
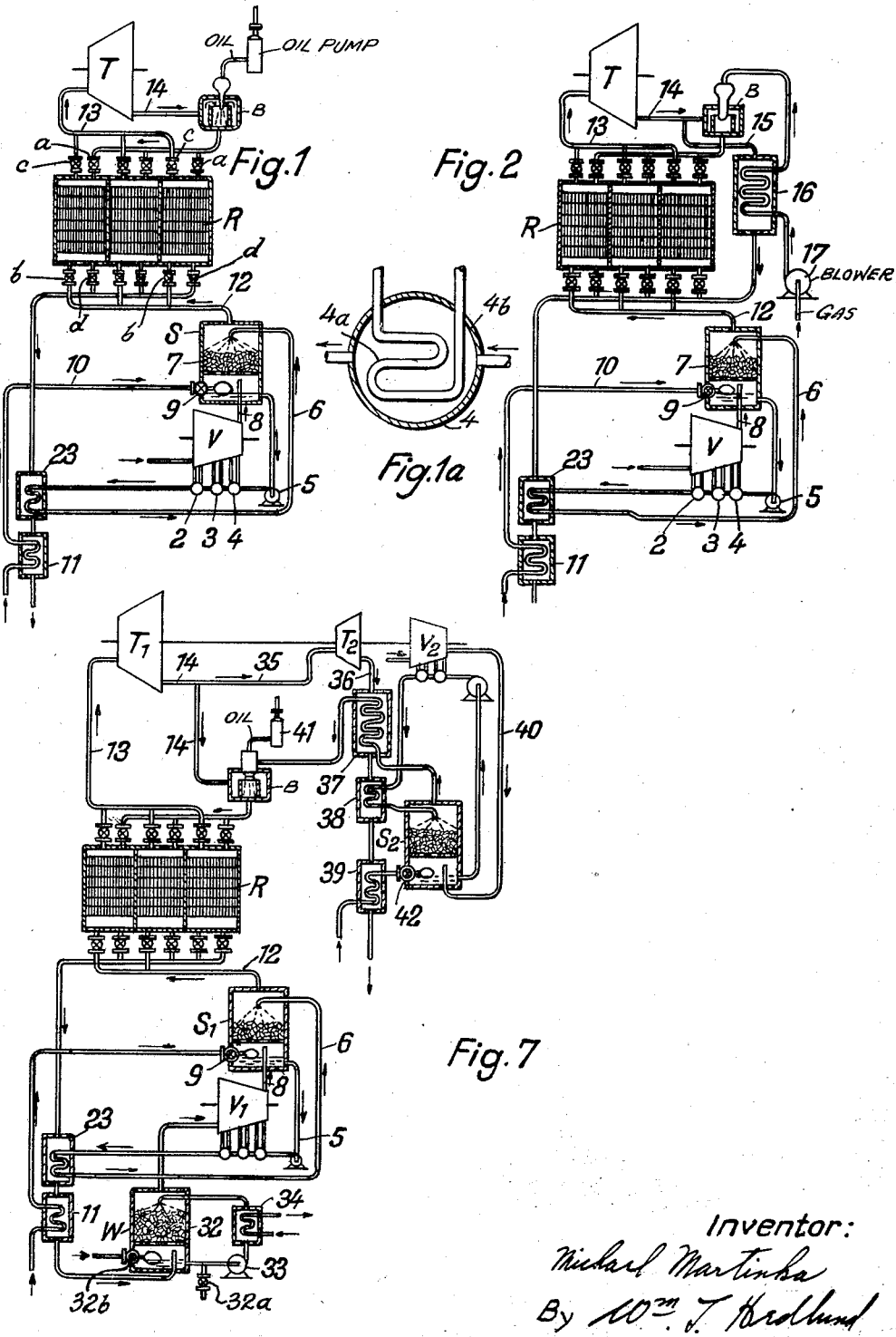
Inventor:
Michael Martinka
By Wm. J. Kirlund
His Attorney Feb. 15, 1944.   M. MARTINKA   2,341,638
POWER ENGINE PLANT
Filed Feb. 21, 1939   7 Sheets-Sheet 2
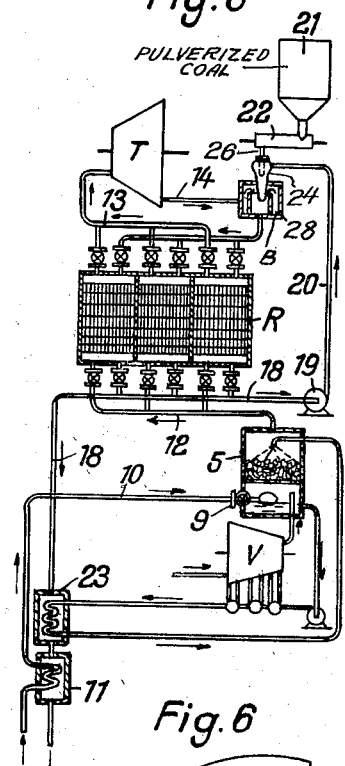
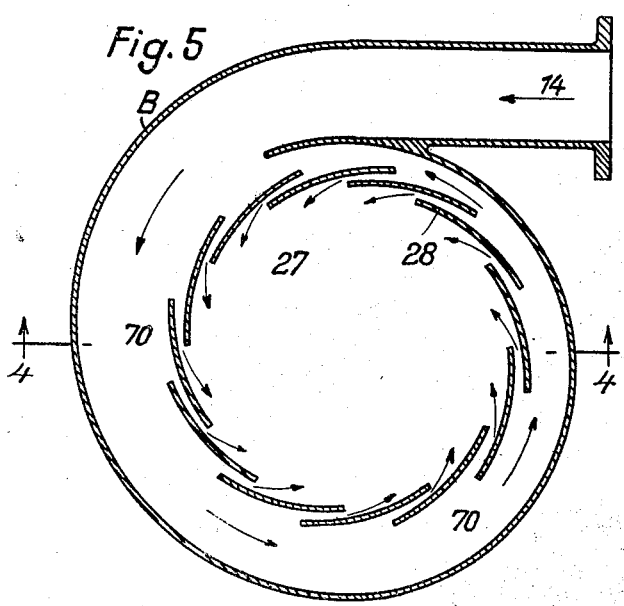
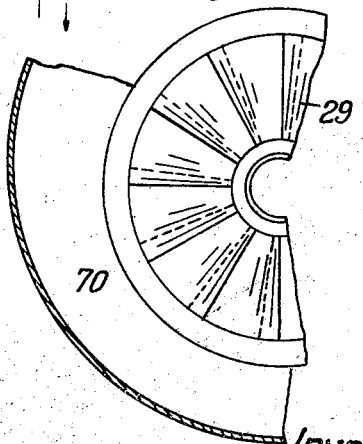
Inventor:
Michael Martinka
By Wm. F. Kirklund
His Attorney

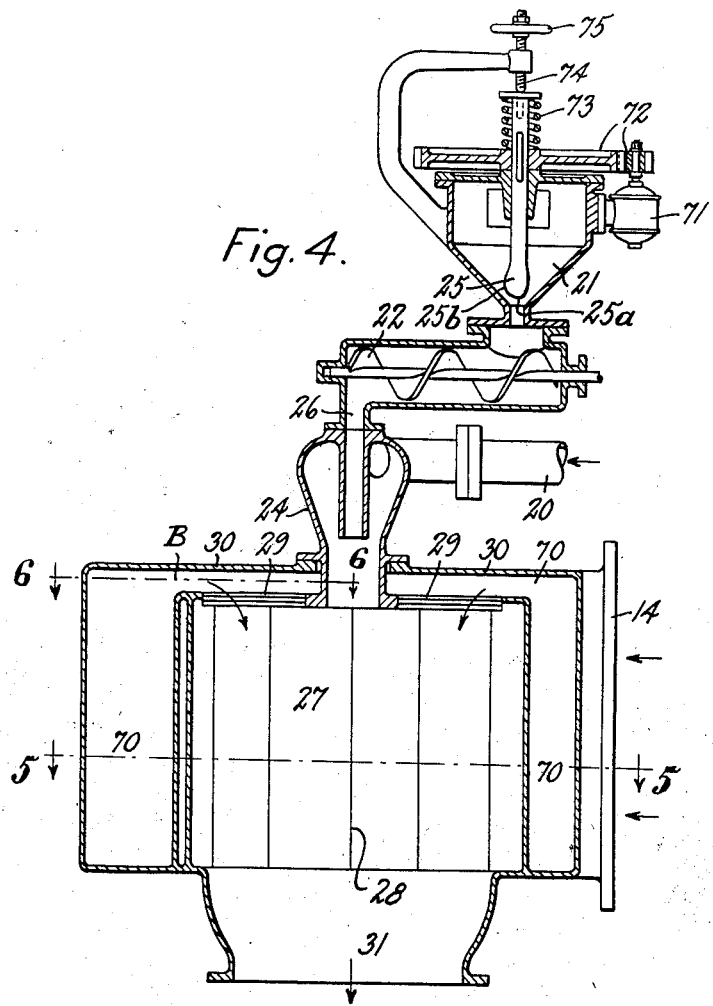

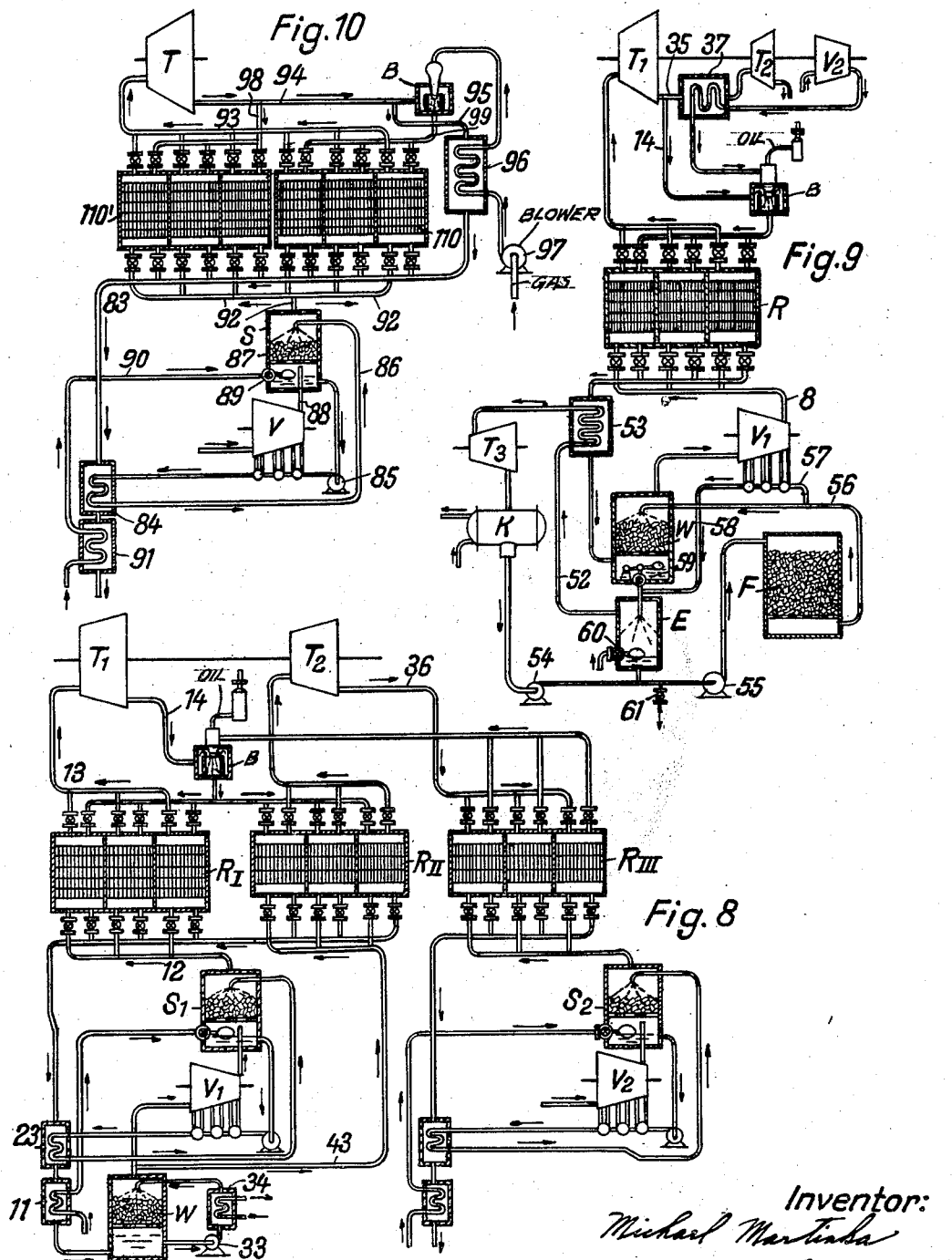

Feb. 15, 1944.　　　　M. MARTINKA　　　　2,341,638
POWER ENGINE PLANT
Filed Feb. 21, 1939　　　7 Sheets-Sheet 5

Inventor:
Michael Martinka
By Wm. T. Hedlund
His Attorney

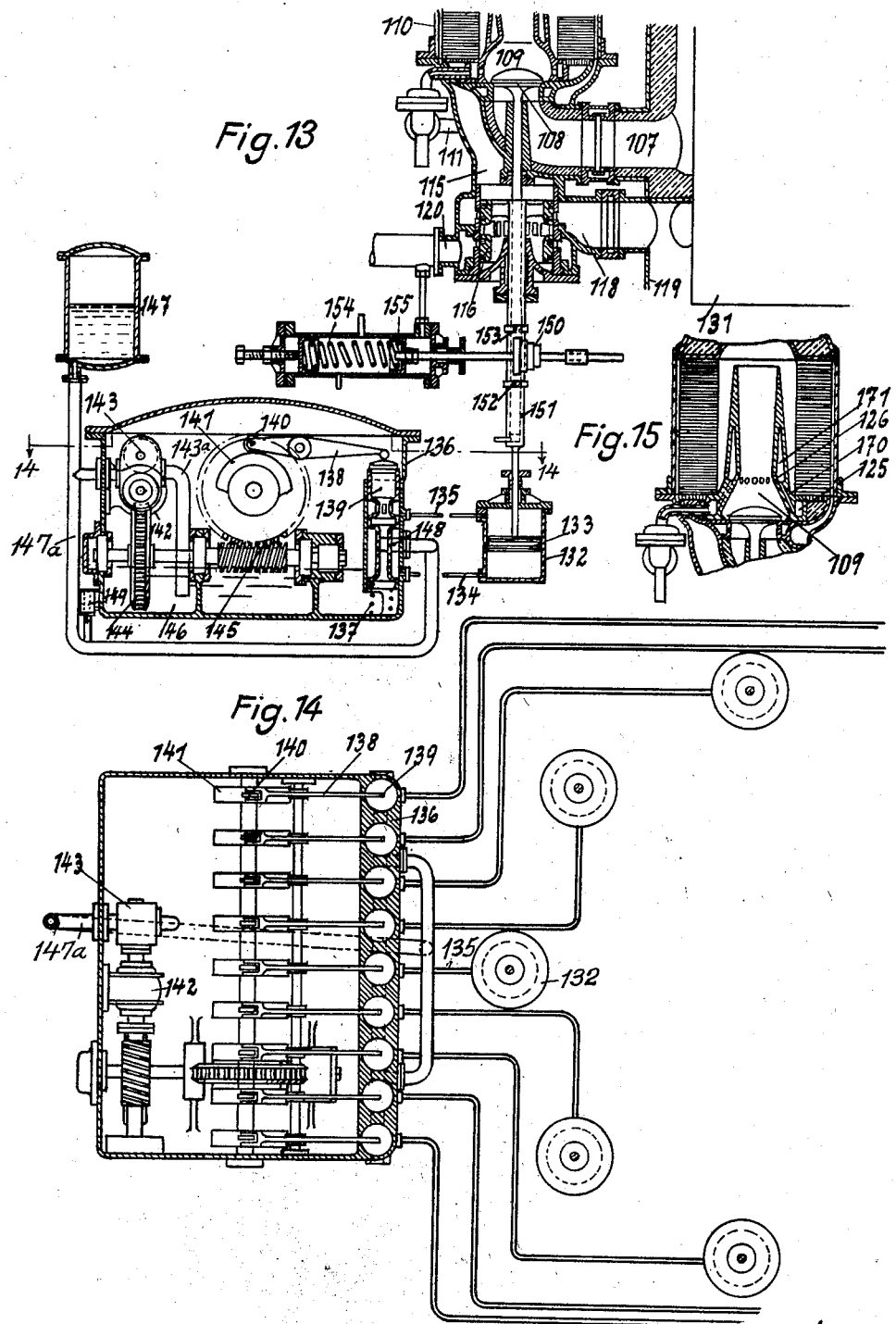

Feb. 15, 1944.  M. MARTINKA  2,341,638
POWER ENGINE PLANT
Filed Feb. 21, 1939   7 Sheets-Sheet 7
Fig. 16
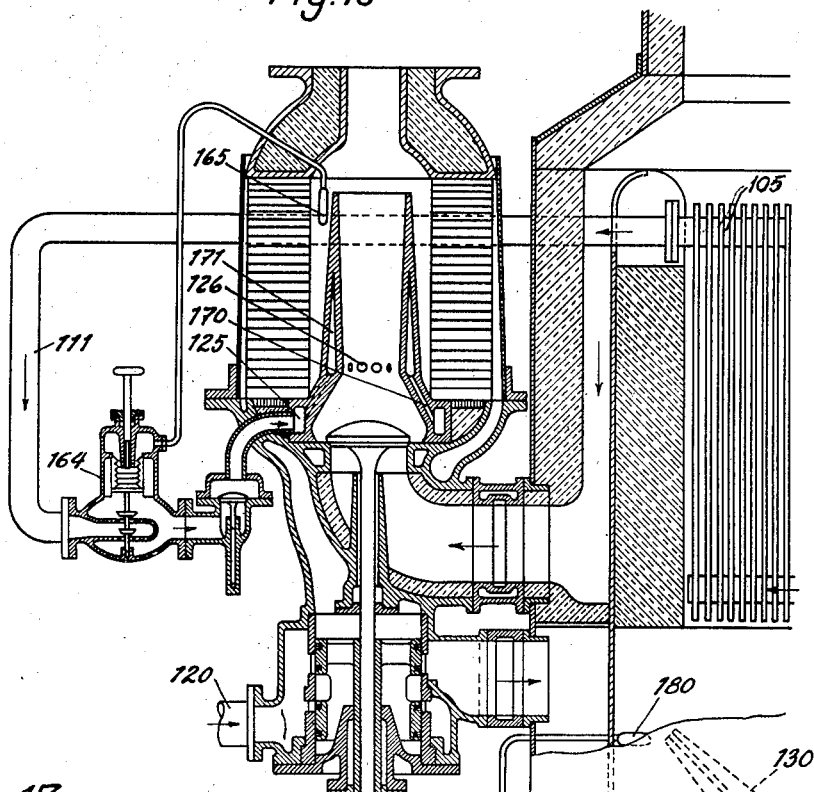
Fig. 17
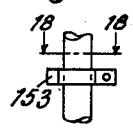
Fig. 18
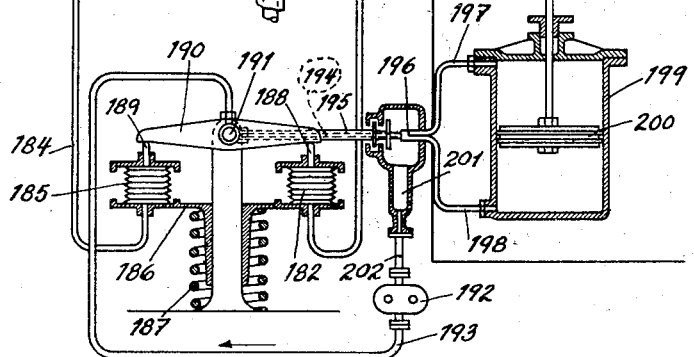
INVENTOR
Michael Martinka
BY
Wm J Hedlund
ATTORNEY Patented Feb. 15, 1944

2,341,638

UNITED STATES PATENT OFFICE 2,341,638

POWER ENGINE PLANT

Michael Martinka, Duisburg, Germany; vested in the Alien Property Custodian

Application February 21, 1939, Serial No. 257,613
In Germany February 23, 1938

8 Claims. (Cl. 60—59)

This invention relates to a power engine plant operated with a gaseous working medium, wherein the working medium is compressed in a compressor, then heated in a heat-exchanger by hot gases, then expanded in the power engine and finally supplied to a combustion chamber where the hot gases are produced by means of fuel supplied thereto. It is the general object of the present invention to improve plants of the general kind above described by the provision of an improved heat exchanger, by means of which heat is transferred from the hot gases to the working medium.

Known plants of the above described kind include surface heat-exchangers wherein the heat of the hot gases is transferred to the compressed working medium through metallic walls. These power engine plants have not hitherto been constructed with success because the materials available for the metallic walls could be heated only to about 550° C., if they are simultaneously exposed to mechanical stresses resulting from the pressure difference existing between the hot gases and the compressed working medium. The thermal efficiency in such a case falls so low that the effective output derived from the fuel was substantially nil, that is, the output of the machine only sufficed to drive the compressor and the useful work was therefore zero.

This invention is based on the understanding that the fuel can be used with advantage only if the transfer of the heat of the hot gases to the compressed working medium can be successfully accomplished under safe conditions of operation at temperatures of about 1000° C. or more. Due to these high temperatures the thermal efficiency becomes so high that an overall efficiency of the fuel can be reached which exceeds those of the steam turbine and equals those of Diesel engines. For this purpose any suitable fuel can be used as well as furnace gas or pulverised fuel.

The high degree of heating of the compressed working medium by the hot gases is effected according to the invention by constructing the heat-exchanger in which the heat of the hot gases is transferred to the compressed working medium as a heat storage member having a plurality of heat storage elements, each of said elements in turn receiving heat from hot gases and another of said elements simultaneously giving up heat in turn to the compressed working medium.

After the element of the heat-exchanger heating the working medium has given up its heat, the working medium to be heated is supplied to another element of the heat store which has previously been heated by the hot gases.

The heat storing medium may consist either of kinds of iron alloys or of other materials such as stone. There are, however, kinds of iron alloys which are capable of operating continuously as heat storage bodies up to 1200° C. as they have to withstand no mechanical stresses.

For an understanding of the more detailed nature and objects of the invention and the advantages to be derived from its use, reference may best be made to the ensuing portion of this specification taken in conjunction with the accompanying drawings forming a part hereof.

Fig. 1 shows a plant according to the invention wherein fuel oil is utilised as fuel.

Fig. 1a is a cross-sectional view, on an enlarged scale, of a cooler shown in Fig. 1;

Fig. 2 is a view similar to Fig. 1, but showing a plant adapted for the use of gaseous fuel;

Fig. 3 is a view of a plant arranged for using pulverized coal as fuel;

Fig. 4 is a cross-sectional view on an enlarged scale of a portion of the device shown in Fig. 3, and is taken on the line 4—4 of Fig. 5;

Fig. 5 is a cross-sectional view taken on the line 5—5 of Fig. 4;

Fig. 6 is a cross-sectional view taken on the line 6—6 of Fig. 4;

Fig. 7 shows a plant in accordance with another embodiment of my invention;

Fig. 8 shows a plant in accordance with a further embodiment of my invention;

Fig. 9 shows a plant in accordance with still another embodiment of my invention;

Fig. 10 shows a plant in accordance with a still further embodiment of my invention;

Fig. 13 is a cross-sectional view showing control apparatus adapted to be used with the device shown in Figs. 11 and 12;

Fig. 14 is a cross-sectional view taken on the line 14—14 of Fig. 13;

Fig. 15 is a cross-sectional view of a modified form of combustion chamber;

Fig. 16 is a cross-sectional view of an additional control apparatus to be used in connection with the device shown in Figs. 11 and 12;

Fig. 17 is a side view of a detail of the apparatus shown in Fig. 16; and

Fig. 18 is a cross-sectional view taken on the line 18—18 of Fig. 17.

Fig. 19 is a detailed view of valve mechanism shown in Fig. 11.

Figure 11:
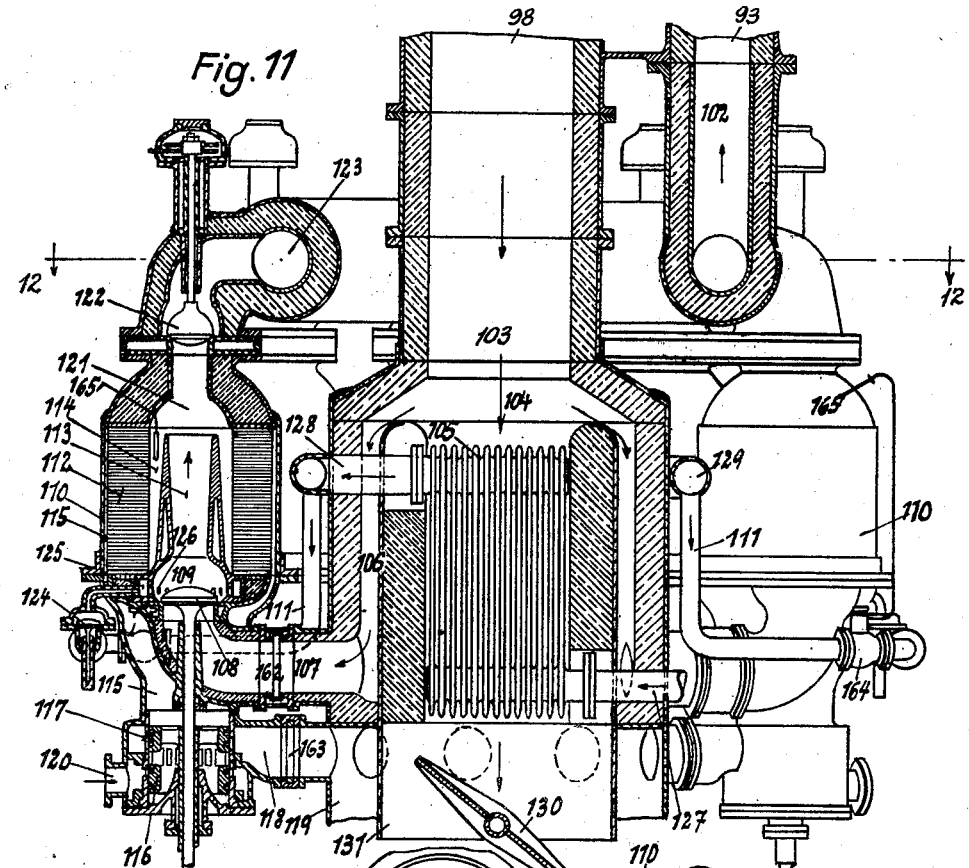
Fig. 11 is a cross-sectional view, of structure suitable for use in the plant illustrated in Fig. 10, and is taken on the line 11—11 of Fig. 12.
Figure 12:
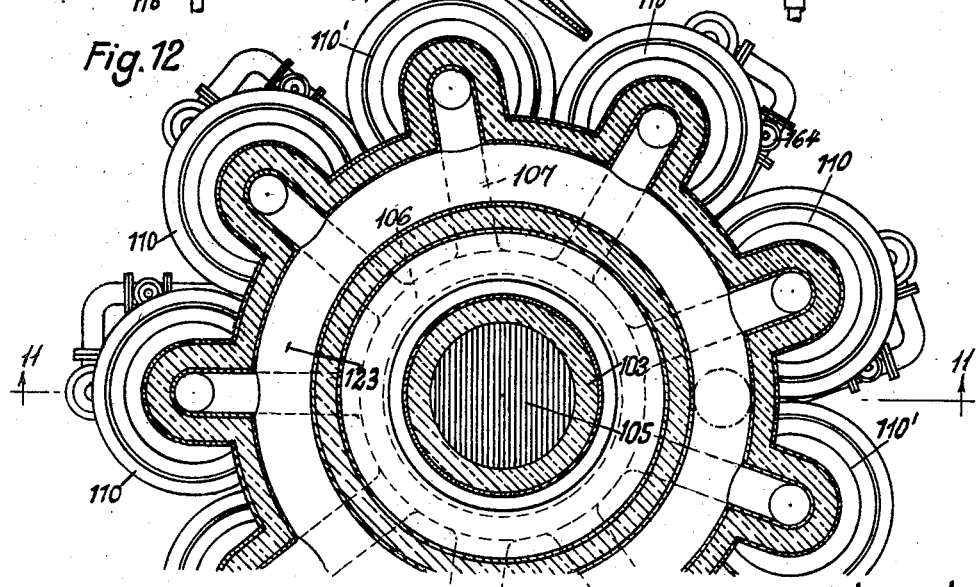
Fig. 12 is a cross-sectional view taken on the line 12—12 of Fig. 11.

Referring to Fig. 1 an embodiment is shown in which fuel oil is burned as fuel in the combustion chamber B in the presence of exhaust gases of the turbine T which consist of pure air or of air having a certain steam content as will be more fully described below. The combustion gases resulting in this manner in the combustion chamber flow through one or more chambers of the heat store R which are arranged in parallel. The heat still contained in the gases on discharging from the heat store is then utilised as far as possible in surface heat exchangers 23 and 11.

The outer air sucked in by the compressor V is brought by the latter in a plurality of stages to a high pressure, surface coolers 2, 3, 4 being arranged in the usual manner between the individual stages in which the air can give up the heat taken up in the preceding compression stages. A pump 5 forces cooling water through the intermediate coolers 2, 3, 4. The water heated on passing through the surface coolers flows through heat exchanger 23 and through a conduit 6 to the upper part of the irrigation layer 7 of a saturator S. One of the coolers is shown in cross-section on an enlarged scale in Fig. 1a and includes a coil 4a, through which the air passes, disposed in a shell 4b, through which water is circulated.

The compressed air from the last stage of the compressor V enters the saturator through the conduit 8 and flows through the layer 7 upwardly in counter-flow to the downwardly trickling water. In this way compressed air becomes saturated with water vapour and at the same time the water is cooled down and in this manner is again prepared to take up heat in the surface coolers 2, 3 and 4. The purpose of the saturator S is to transfer the heat removed from the air in the intermediate coolers 2, 3, 4 and transferred to the cooling water wholly or partly back to the air in the saturator.

The water vaporized in the layer 7 is replaced through a float control 9. This additional water which is supplied through the conduit 10 flows through the above mentioned surface heat-exchanger 11 which is heated by the combustion gases leaving the heat store.

The air enriched with water vapours which leaves the saturator S through the conduit 12 passes through one or more store-chambers inserted in parallel and previously heated up by the combustion gases and then flows through the conduit 13 in a considerably heated condition into the turbine T where it is expanded and transfers its energy in the form of mechanical work to the turbine wheel.

The air expanded for example almost to the outer air pressure and considerably cooled down leaves the turbine T through the conduit 14 and is then brought in the above described manner in the combustion chamber to the highest temperature and then as hot gas enters the chambers of the heat store which are to be heated. The heat store R has at least three individual chambers, each of which has inlet valves $a$ and $b$ and outlet valves $c$ and $d$, which are operated in known manner so as to bring the chambers periodically and successively into operation. The change over takes place in such a way that after one period in which the valves $a$ and $d$ are open and valves $b$ and $c$ are closed, whereby the storage material is heated up by the combustion gases there follows a period when the valves are reversed and the material is cooled down by the air to be heated. After the resultant cooling down the particular storage chamber is again changed over by reversing the valves for heating up by the combustion gases.

In the individual members of the plant the following pressures and temperatures may for example exist. It may, for example, be assumed that the temperatures of the hot gases on leaving the combustion chamber B are about 1000° C., and that the gas temperature on giving up heat in the heat store R sinks to about 160° C. so that the gases flow out of the heat store with the latter temperature.

The fresh air is compressed in the compressor V to about 7-atm. abs. The temperature of the compressed air before entering the heat store R is about 150° C. and on leaving the heat store about 950° C. In the power engine T the air expends down to nearly 1-atm. abs. In the expansion nozzles of the power engine which are inserted in front of the blade rim of the impeller wheel the temperature of the air during expansion falls to about 600° C. Due to friction against the blades of the impeller wheel the temperature again rises somewhat so that it leaves the power engine T at nearly 1 atm. abs. at about 650° C., and enters the combustion chamber B.

In the construction shown in Fig. 2 gaseous fuel is utilised for heating the combustion chamber B. In this case it is preferable to pre-heat the combustible gas in a heat-exchanger 16 which is heated by waste gases from the power engine T, which as above described, consists either only of air or of air with a definite steam content. Part of the engine waste gases flows through the conduit 15 to the pre-heater 16 and the remainder is supplied to the combustion chamber B for the combustion of the gaseous fuel. The combustible gases are circulated by the blower 17 which produces only a small pressure above atmosphere, through the pre-heater 16 into the combustion chamber B.

In order, on the pre-heating of the combustible gases, to effect a favourable thermal utilisation of the heat of the exhaust gases, the heat-exchanger for the pre-heating of the combustion gases must be dimensioned for such a part of the exhaust gases of the power engine that the product of the weight of this part of the exhaust gases and their specific heat is equal to the product of the weight of the combustible gases and their specific heat; in this case there results at the inlet and outflow sides of both gases the most favourable temperature difference between the two.

If for heating the combustion chamber pulverised solid fuel is chosen, as illustrated in Fig. 3, consideration must be paid to the fact that this fuel must be blown in with air or with a gas mixture containing much air, the temperature of which, however, must not be sufficiently high to cause pre-ignition of the fuel by this air blast.

The pulverised solid fuel is, therefore, blown in in a suitable manner with exhaust gases having a high air content which leave the heat store and are consequently strongly cooled down therein.

From a collecting conduit 18 through which pass the exhaust gases flowing out of the store R a part of the exhaust gas is removed and is supplied to a blower 19 which increases the pressure of the cooled exhaust gases sufficiently to operate as an injector into the combustion chamber B and to be able to overcome the resistance of the heat store R. The exhaust gases pass from the blower 19 through a conduit 20 into the top of the combustion chamber B where they are mixed with solid fuel fed from a container 21 by a feeding device 22 and blow said fuel into the combustion chamber B. There the blown in mixture meets the exhaust air supplied through the conduit 14 in which the solid fuel is burnt. The highly heated combustion gases then flow into the heat store R as described in the preceding example.

The manner of the air compression and the enriching of the finally compressed air with water vapours by partial evaporation of the cooling water of the intermediate coolers of the air compressor may be effected similarly as in the embodiment described with reference to Fig. 1. The enrichment of the compressed air with vapours may, however, be further increased by the cooling water which leaves the intermediate coolers 2, 3 and 4 being further heated in a heat-exchanger 23 which is heated by the exhaust gases from the heat store R. These exhaust gases subsequently flow to the heat-exchanger 11 in which the additional water which passes through the float control 9 is pre-heated.

The combustion chamber B is formed with a head 24 in which the pulverised fuel mixes with the exhaust gases. These exhaust gases supplied through the conduit 20 enter the mixing head 24 tangentially. The pulverised fuel which is present in the storage chamber 21 falls from the lower part of this storage chamber in regulatable amounts. The amount so delivered may be controlled by the vertical position of a vertical rotating shaft 25. The lowest part 25a of this shaft 25 is constructed in the form of a valve while immediately above this part the shaft has a cross-section which is non-circular and non-uniform, as is shown at 25b. Due to this and by the rotation of the shaft arching of the mass of pulverised fuel in container 21 is prevented with the result that the downwardly directed movement of the pulverised fuel continues without interruption.

The shaft 25 is rotated by the motor 71 through the gear and pinion transmission system 72. The gear is keyed to the shaft 25 so that the shaft may have relative axial movement with respect to the gear. A spring 73, disposed between the hub of the gear and a flange on the upper end of the shaft, forces the shaft against a threaded spindle 74. The spindle is adjustable by means of a hand wheel 75 to adjust the heighth of the shaft. The fuel dropping from the container 21 passes into a chamber located below the same and fitted with the feeding device 22 by which it is moved to the left until it reaches the conduit 26 in which it falls downwardly. At the lower end of the conduit 26 the fuel is carried along by the exhaust gases admitted through conduit 20 and passes mixed therewith into the actual combustion space 27 of the combustion chamber B.

The hot air coming from the turbine T is supplied to this combustion space 27 through the conduit 14 which opens tangentially into the housing of the combustion chamber B. The air then passes through guide blades 28, which overlap at their ends with the result that only a part of their surface is exposed to the heat radiation of the combustion taking place in the combustion space 27 whilst the remaining surface is contacted by the very much cooler gases which are supplied through the conduit 14 and are thereby cooled. Further, a part of this gas passes through the upper annular opening of the combustion space 27 which is preferably provided with screw-shaped blades 29, into the combustion space and thereby cools the upper bounding wall 30 of the combustion chamber B. These screw-shaped blades also overlap in a similar manner as the blades 28, as can be seen from Fig. 6. The highly heated combustion gases flow out of the combustion chamber B through the outlet branch 31 and pass to the heat store.

It is well known that the output of a heat engine may be considerably increased if the inlet pressure and the outlet pressure are increased while the temperatures remain constant. If, for example, in a turbine the pressure on entry into the turbine amounts to 7 atm. abs. whilst the outlet pressure is 1 atm. abs. the output of this turbine will be increased threefold if the pressures are increased three times, that is if the pressure in front of the turbine amounts to 21 atm. abs. and the outflow pressure to 3 atm. abs. If the temperatures in front of and behind the turbine are the same as in the first case three times the weight of the driving medium pass through the turbine. Use is made of this relation in the plant illustrated in Fig. 7.

The main part of the gases exhausting from the turbine $T_1$ in the plant shown in Fig. 7 flows through the conduit 14 to the combustion chamber B with a pressure now higher than atmospheric. Here the gases are heated in a manner more fully described below, pass into the heat store R where they give up their heat and are further cooled down in the heat-exchangers 23 and 11. From the latter, however, they do not pass into the atmosphere but are supplied to a washer W in which they are freed from impurities and moreover both from dust-like impurities and also from any acid constituents. This is preferably effected, for example by a percolation layer 32 formed of percolation bodies which are sprayed from above by an alkaline solution (for example lime water) whilst the gases to be cleaned flow through the liquid trickling down in counter-flow from below upwardly through the layer 32.

From the washer W the purified gases are supplied to the air compressor $V_1$ which compresses them and forces them to the turbine $T_1$. The devices by which the purified gases are compressed and are transferred to the power engine $T_1$ are constructed in a similar manner to the devices illustrated in Fig. 1 for compressing and conveying the air. The lime-water of the washer W may be circulated in a circuit by the pump 33 and according to the desired action it may be heated up in a heat-exchanger 34 or may be cooled. According to the acid content of the gases it may be advisable to remove a larger or smaller part of the alkaline solution from this circuit through the valve 32a and to replace the same by fresh lime-water through the float controlled valve 32b.

If a plant is operated in this manner, the oxygen content of the gases always moving in a closed circuit into the combustion chamber B would very soon be consumed. In order to maintain the plant continuously in operation it is, therefore, necessary to remove a part of the gases from the circuit and to replace the same by new oxygen-containing air by which the fuel in the combustion chamber is burnt.

The gases to be led away, which are not yet completely expanded are conveyed through a conduit 35 which is branched off from the conduit 14 into a turbine $T_2$ in which they are expanded to atmospheric pressure. The exhaust gases therefrom are supplied through a conduit 36 to a heat-exchanger 37 which serves for heating up the compressed air. As the latter deals with considerably lower temperatures than the heat-exchanger R, this heat-exchanger 37 may also be a surface heat-exchanger. After the exhaust gases have traversed surface heat-exchangers 38 and 39 they pass into the atmosphere.

In order to replace the exhaust gases which are removed from the high-pressure circuit through the conduit 35 by fresh air, an air-compressor $V_2$ is provided which sucks in atmospheric air and forces the same through the conduit 40 into a saturator $S_2$. The air charged with vapours in the saturator $S_2$ and heated in the heat-exchanger 37 then flows into the combustion space. The air thus supplied facilitates the combustion of the fuel supplied, for example by the fuel oil pump 41. The intermediate coolers of the air-compressor $V_2$ are provided in a similar manner with circulating water as in the plant according to Fig. 1, but here also the cooling water leaving the intermediate coolers may be heated additionally in the heat-exchanger 38. The additional water is pre-heated in the heat-exchanger 39 and supplied through a float control 42 to the saturator $S_2$ in which the water is cooled down.

In the above described system the highest temperature exists in the combustion chamber B in which the low pressure of the high pressure circuit prevails. The temperature of the gases in the conduit 13 which have been heated in the heat store R is only slightly less. These gases are at the high pressure of the high pressure circuit and are expanded whilst doing work in the turbine $T_1$ to an intermediate pressure which is the low pressure of the high pressure circuit and are thus cooled down to an intermediate temperature.

With this mean temperature and pressure the part of the gases removed from the high pressure circuit through the conduit 35 enters the low-pressure turbine $T_2$ to be expanded to about atmospheric pressure.

One disadvantage of the process of operation of this system is that the low pressure part of the system operates with a more unfavourable thermal efficiency than the high pressure part since the low pressure turbine $T_2$ is impacted by driving gases of lower temperature than the high pressure turbine $T_1$.

This disadvantage may be avoided by transferring the heat of the hot combustion gases to the driving medium of the low pressure turbine through the intermediary of a heat storing device having a number of parts as illustrated in Fig. 8. The driving gases intended for the low pressure turbine $T_2$ are removed from the main stream of the gases above the washer W through a conduit 43 and are supplied to a multiple-element heat store $R_{II}$ which similarly to the store $R_I$ is heated by a part of the combustion gases from the combustion chamber B. The driving gases supplied to the low pressure turbine $T_2$ are in this manner brought to the same temperature as those in the high pressure turbine $T_1$.

In the system according to Fig. 8 there is provided for the heating of the compressed air produced by the compressor $V_2$ instead of the surface heat-exchanger 37 of Fig. 7, a heat store $R_{III}$ in which the compressed air is heated to practically the same temperature as that of the gases flowing out of the high pressure turbine $T_1$.

The system illustrated in Fig. 8 has also in the low pressure part a high thermal efficiency, since the low pressure turbine is also impacted by gases at temperatures of about the same value as the higher pressure turbine $T_1$. If the expansion ratio in both turbines is the same, for example in the high pressure turbine $T_1$ from 49 atm. abs. to 7 atm. abs. and in the low pressure turbine $T_2$ from 7 atm. abs. to 1 atm. abs. and thus have a ratio of 7:1 the outflow temperatures from the turbines in the conduits 14 and 36 will be about the same. The air pre-heated in the heat store $R_{III}$ will be heated nearly to this temperature.

The embodiments shown in Fig. 8 operates as follows:

The outside air, drawn in by the compressor $V_2$ is compressed to a mean pressure, of for instance 7 atmospheres and is saturated in the saturator $S_2$ with water vapor and is then preheated in the regenerator $R_{III}$, from where it is fed to the combustion chamber B. There it burns the fuel which has been fed to this point and mixes with the waste gases of the turbine $T_1$, which are introduced through the conduit 14. The combustion gases leaving the combustion chamber B heat both the regenerator $R_I$ and the regenerator $R_{II}$. The combustion gases which have been cooled in the regenerators $R_I$ and $R_{II}$, are cooled further in the heater 23 for the circulating water, which is conducted through the intermediary coolers of the compressor $V_1$, and the saturator $S_1$ and in the heater 11 for the water added to this cycle. Thence, the cooled combustion gases reach the gas washer W, in which alkaline water, such as lime water, "binds" the acids originating from the fuel. The pump 33 circulates the wash water. The heat exchanger 34 may be connected in the cycle. Part of the washed combustion gases is compressed by means of the compressor $V_1$, for instance from 7 to 45 atmospheres absolute. The gases heated by means of the saturator $S_1$ and the regenerator $R_I$ to nearly the temperature of the combustion gases of the combustion chamber B reach the conduit 13 and through the latter the turbine $T_1$, where they are expanded, say from 45 to 7 atmospheres whereupon they are conveyed, as stated before, through the conduit 14 into the combustion chamber B.

The other portion of the combustion gases which leave the washer W travel, with the said mean pressure of, say 7 atmospheres, through the conduit 43 to the regenerator $R_{II}$, and there are heated to near the temperature of the combustion gases of the combustion chamber B, whereupon they expand in the turbine $T_2$ almost to atmospheric pressure. The waste gases of the turbine $T_2$ are conveyed, by means of the conduit 36 to the regenerator $R_{III}$. Having lost, at this point, a great deal of their heat they are cooled still further in the heater for the water which, in the course of the cycle, is carried through the intermediate coolers of the compressor $V_2$, and the saturator $S_2$, and in the heater for the water which is added to this cycle.

A particularly simple construction of the low pressure part of the system is obtained if the combustion gases to be replaced and removed from the high pressure circuit are as in Fig. 7 removed from the exhaust gas conduit of the turbine $T_1$ and are, however, supplied not directly to the turbine $T_2$, but as shown on Fig. 9 firstly through a heat-exchanger 37 and then to the turbine $T_2$. Here the gases are expanded to the outer pressure as far as possible adiabatically, and are then expelled at a lower temperature into the atmosphere.

The compressed air is compressed adiabatically in the compressor $V_2$ to the combustion chamber pressure then heated in the heat exchanger 37 which may also be a heat store and so supplied to the combustion chamber. This particularly simple construction is advisable especially when the low pressure of the high pressure circuit is not particularly high, so the adiabatic air compression then only leads to moderate temperatures. If gaseous fuel is used this in like manner should be compressed. The load of the low pressure compressor or compressors with a system according to Fig. 9 is greater than the output of the low pressure turbine $T_2$ so that, therefore, the high pressure part of the system must give up part of its output to effect the low pressure compression.

In a plant provided with a high pressure circuit and a gas washer W, as for example shown in Fig. 7, the gases passing into the washer W are in general so warm that the washing water leaves the latter at over 100° C. In order to cool it down and to include the heat thus released for power production, the water heated in the washer W as shown in Fig. 9 is relieved of pressure in a chamber E wherein a much lower pressure exists than in the washer W, for example about atmospheric pressure although it may be somewhat higher or lower. On relieving the water of pressure it is cooled down with the evolution of vapour to the boiling temperature at the pressure prevailing in the chamber E for example with atmospheric pressure to 100° C.

The resultant vapour passes through conduit 52 to a superheater 53 which is heated by the exhaust gases of the heat store R and then to a low pressure steam turbine $T_3$. From this the expanded exhaust steam flows into a condenser K. The condensate is circulated by a pump 54 at the pressure of the water running out of the pressure releasing chamber. Together with the latter the condensate is forced by the pump 55, if necessary through a filter F, into the upper part of the washer W.

From the water pressure conduit 56 leading to the washer W a branch conduit 57 may be led to the intermediate coolers 2, 3 and 4 of the compressor $V_1$ which are traversed by the cooling water in series or preferably in parallel. The water heated in the same passes through the conduit 58 to the pressure relieving chamber E where it is again cooled down to for example 100° C. with the formation of steam.

A float valve 59 in the lower part of the washer W maintains a constant water level therein since it allows only so much water to run away to the pressure relieving chamber E as passes into the upper part of the washer container.

A float valve 60 in the lower part of the pressure relieving chamber E controls the supply of fresh water which is particularly necessary if a part of the circulating water runs away continuously through an adjustable drain 61 in order to prevent the circulating water becoming too concentrated with salts.

For controlling the output produced by the power engine it is preferable to vary the temperature of the working medium (compressed air) entering the power engine. This is effected in accordance with the invention by dividing the heat-storage devices into two multiple-element storage members one of which is heated to a lower temperature than the other and by providing means by which the amounts of air heated in the two storage members to different temperatures can be mixed in regulatable proportions. Preferably one storage member is heated by the working medium exhausting from the power engine and the other storage member by the combustion gases flowing out of the combustion chamber.

In Fig. 10 such a plant is diagrammatically illustrated. It differs from the system shown in Fig. 2 only by the provision of two heat storage members 110, 110' which are heated in different ways and each of which consists of three separate compartments. The air expanded in the power engine T flows with a temperature of, for example 650° into the conduit 94 from which it flows in part through the conduit 98 into one or two compartments of the store 110'. Another part of the exhaust air from the power engine passes to the combustion chamber B where it comes in contact with the combustible gases supplied by the blower 97 and heated in the surface pre-heater 96. The pre-heater 96 is heated by another part of the exhaust air. The combustion gases formed in the combustion chamber B and heated, for example to 1100° C., pass through the conduit 99 into one or two compartments of the heat store 110 and thereby heat this store. The entire expanded air exhausting from the power engine T, including the combustion gases cooled down in the pre-heater 96 and the combustion gases formed in the combustion chamber B, collect in the conduit 83 and pass, after further cooling in the heat-exchangers 84 and 81, into the atmosphere.

The air compressed in the compressor V flows by conduit 88 through the saturator S traversed by the cooling water of the compressor and then passes into the conduit 92 from which it passes in part into one or two compartments of the storage member 110' heated to a lower temperature and in part into one or two compartments of the storage member 110 heated to a higher temperature. The part of the compressed air heated in the heat store 110' to substantially 650° and the part of the compressed air heated in the heat store 110 to substantially 1100° C. pass into the conduit 93, are here mixed and flow at a mean temperature to the power engine T in which they are expanded.

The value of this mean temperature of admixture may be regulated by controlling the proportion of the amount of air which heats the store 110' relatively to the amount of air which is supplied to the combustion chamber B and as combustion gases heat the store 110, as well as by regulating the proportion of the amounts of compressed air supplied to the two stores. It is thus possible by varying the ratio of said amounts to control the temperature of the compressed air flowing through the conduit 93 to the power engine T without altering the temperature ratios of the two heat stores.

Each heat storage member must consist of at least three compartments each of which is heated or cooled down alternately so that the heating gases and also the air to be heated always have a free passage therethrough.

In Figs. 11-15 are more fully illustrated members of a plant according to Fig. 10, especially the storage and combustion plant as well as the regulating system.

The hot compressed air heated, for example to 950° C. at a pressure of for example 7-8 atm. abs., flows through the pipe 102 (Fig. 11) vertically upwards to the pipe 93 leading to hot air engine which may be a turbine or a piston engine. There the compressed air is expanded to nearly atmospheric pressure so that its temperature sinks to 650° C. With this pressure and temperature the air flows through the exhaust air conduct 98 to the conduit 103, which extends downwardly to the chamber 104 where the exhaust air stream is divided into a central portion which contacts with the hot surfaces of a heat-exchanger 105 and an outer portion which is led downwardly through the annular space 106.

From the annular space 106 the expanded exhaust air flows through a number of, for example nine, radial tubular sockets 107 into the chamber 109 of the heat stores 110 or 110' controlled by a valve 108. The heat stores 110 and 110' differ from each other by the fact that the heat stores 110 are provided with a connecting conduit 111 for a combustible gas while for the heat stores 110' this connecting conduit is either dispensed with or closed. Of the nine heat stores arranged in a ring around the waste air conduit 103 six heat stores 110 have their own combustion chamber. The stores are preferably so arranged that two stores 110 always alternate with one store 110'. This manner of sub-division is only cited as an example and relates to an embodiment wherein furnace gas is used.

In the heat stores 110', to which no combustible gas is supplied, the exhaust air heated to about 650° C. flows during that period when the storage material 112 should be heated up, out of the tubular branch 107 through the open valve 108 into chamber 109. From the latter it flows through the cone-shape widened passage 113 into the annular chamber 114 from which it flows into the storage mass 112 which surrounds the chamber and consists of horizontal sheet metal layers. Through the small spaces between the individual metal sheets the exhaust air flows from the interior radially outward. In this way the exhaust air gives up its heat to the storage mass consisting of metal sheets and flows considerably cooled down into the chamber 115 which is arranged with its upper part in the form of a ring around the storage mass 112. During the charging of the accumulator mass 112 the valve 108 is opened and the piston slide valve 116 is in its upper position. The air cooled by the delivery of heat to the accumulator mass 112 flows downward from the chamber 115 into the inner space of the piston slide valve 116 and from there through the openings of the slide valve housing 117 into the space 118 from where it flows into the exhaust pipe 119.

When the metal plates which form the storage mass 112, and which in known manner are formed with interruptions in the direction of flow, have been heated up sufficiently the valve 108 is closed and the slide valve 116 is brought into its lower position so that it releases the lower openings in the slide valve casing 117. In this way compressed air of, for example 7 to 8 atm. abs. which is supplied through the branches 120 may flow into the space 115 and thence be forced radially inwardly from the outside through the storage material 112 so that this compressed air withdraws heat from the storage material and is itself heated up and moreover substantially to the temperature for example 650° C., with which previously the expanded exhaust air entered the storage material. The compressed air heated up in this way flows into the chamber 121, raises the valve 122 due to its excess pressure and passes to the annular conduit 123 from which together with the air heated in the other heat stores 110 and 110' it passes into the conduit 102 extending vertically upward.

When heat has been withdrawn in this manner from the storage material 112 to a sufficient extent the slide valve 116 is again moved upwardly so that it passes firstly into the position shown in Fig. 11 in which it has closed the lower openings of the slide valve casing 117. No more compressed air can thus enter said casing. Consequently the valve 122 falls back on its seating. The slide valve 116 is then moved further upwardly, uncovers the upper openings in the slide valve casing 117 so that the compressed air still present in the chamber 115 can escape to the branches 118 and to the exhaust air conduit 119. As soon as the slide valve 116 has completely uncovered the upper openings in the slide valve casing 117 the valve 108 is also lifted so that again the hot expanded exhaust air can enter from the annular space 106 through the branch 107 into the store 110 and the heating up of the storage material 112 is repeated in the above-described manner.

One difference between the heating up of the heat store 110 as compared with the heating up of the heat store 110' consists in that the warm exhaust air which passes through the branch 107 to the valve 108 and into the space 109 is here mixed with pre-heated combustible gases which are supplied through the conduit 111. This gas which flows through the conduit 111 is allowed to pass by the valve 124 which operates automatically or preferably is controlled and passes into the annular space 125 and from the latter through the openings 126 into the space 109 in which the jets of the combustible gas flowing through the openings 126 meet the waste air-stream substantially at right angles. Due to this and to the path of flow which first narrows and finally widens out, efficient admixture of air and combustible gas is produced.

Instead of the gas, liquid or pulverised solid fuel injected by air heated to a lower temperature, may also be used. The mixture of air and combustible gas ignites against the hot walls of the chamber 113, that is unless ignition has not already taken place during mixing on account of the high temperature which, for example lies between 600° and 650° C. During the combustion the temperature rises for example to 1100° C. At this temperature the gases flow out of the annular chamber 114 into the spaces of the heat storage material 112 to which they give up their heat, so that as above-described with respect to the heat store 110' they are cooled in the chamber 115 and from the latter flow through the slide valve 116 to the outflow branch 118 and thence into the exhaust air conduit 119.

After the heat storage material has been sufficiently heated up in this manner it will be changed over in the same way as described for the heat store 110', the valve 124 which allows the combustible gas to pass being closed by the control device or in the case where it is an automatic valve due to its own weight and on account of the excess pressure which is formed in the storage chamber. The heating up of the compressed air supplied through the branch 120 thus begins which air, however, in the heat store 110 is heated to a much higher degree than in the heat store 110', for example, up to about 1100 C.

The heating of the combustible gases which are supplied through the conduit 111 to the heat store 110 takes place in the heat-exchanger 105 which is heated by a part of the exhaust air heated to for example about 650° C. For this purpose the combustible gas is supplied, at a pressure slightly above atmosphere which may be produced by a fan (not shown) through conduit 127 to the heat-exchanger 105 which consists of a large number of parallel cells into which the combustible gas enters at the bottom. In this, the combustible gas flows upwardly in the cells and leaves the latter through the conduit 128 and passes into the annular conduit 129 to which the branch conduits 111 leading to the stores 110 are connected.

The numerous cells of the heat-exchanger 105 are contacted on the exterior by the vertical downwardly directed stream of the hot exhaust air which in complete counter-flow to the rising combustible gas, gives up its heat to the latter and leaves the lower end of the heat-exchanger 105 in a cooled down condition.

In this way that part of the exhaust air which gives up its heat to the surface heat-exchanger 105 is cooled down just as much as that part of the exhaust air which is led through the heat stores 110 and 110' and then passes into the annular chamber 119. The cooling down of the two fractions of the exhaust air to the same temperature can be effected by controlling the amount of the exhaust air led through the heat-exchanger 105 by means of the throttle flap valve 130 operated by hand or thermostatically. With thermostatic control the arrangement is such that the adjustment of the throttle valve 130 is responsive to the temperatures in the exhaust air conduit 131 and in the annular conduit 119.

The automatic adjustment of the throttle valve 130 in the manner that in the exhaust gas conduits 119 and 131 the same temperature prevails, can be achieved by a device such as shown in Fig. 16. In the exhaust gas conduit 131 there is arranged a vessel 180 filled with liquid of a high boiling point, which, through the conduit 181, is connected with the inside space of the metal bellows 182. Inasmuch as the system is completely filled with liquid, the metal bellows 182 expand upon an increase in the temperature of the liquid enclosed in the receptacle 180. In the same manner there is arranged in the conduit 119 the receptacle 183 which, through the conduit 184, is connected with the inner space of the metal bellows 185. Both metal bellows 182 and 185 are arranged on a plate 186 which is guided vertically in the center and which is pressed upward by a spring 187. The upper front surfaces of the metal bellows 182 and 185 press, with the pins 188 and 189, against the two ends of a double arm lever 190 which is turnable around the shaft 191. As long as the temperature in the two receptacles 180 and 183 is the same, like pressures will also prevail in the metal bellows 182 and 185 and the pins 188 and 189 will be at the same height. The plate 186 in this connection will assume a position which is lower, the higher the temperature in the receptacles 180 and 183. If now, however, for instance, the temperature in the receptacle 180 is higher, then the liquid will expand to a greater extent and the consequence of this is that the metal bellows 182 become somewhat longer than the metal bellows 185. The pin 188, therefore, will be higher than the pin 189, on account of which the lever 190 assumes an oblique position. This circumstance is made use of in order to adjust the throttle valve 130. For this purpose the pump 192 through the conduit 193 feeds oil under pressure to the hollow shaft 191, which oil reaches the lever 190 through the opening 194, in the jet pipe 195, from the end of which it discharges at high speed. Opposite the mouth of the injector pipe there is arranged the edge 196 which forms the separating wall between the two conduits 197 and 198 which are connected with the two sides of the cylinder 199 in which the piston 200 is arranged.

If, as assumed above, the injector pipe 195 is pressed upward, the pressure oil flows through the pipe 197 into the upper part of the cylinder 199, which brings it about that the piston 200 is lowered, whereby the throttle valve 130 closes somewhat further. On account of this less gas will flow through the conduit 131. This smaller quantity of gas is cooled more strongly by the heat exchange surfaces 105 (see Fig. 11) whereby the temperature of the gas, which comes in contact with the walls of the receptacle 180, is lowered. In this manner equality of temperature is again restored in the exhaust pipes 131 and 119. The process is the reverse if the temperature in the exhaust gas conduit 119 should be somewhat higher and if on account of this the receptacle 183 is heated to a higher extent than the receptacle 180.

The pressure oil flowing from the opening of the injector pipe 195, in so far as it does not reach the cylinder 199 during the displacement of the piston 200, flows from the collector chamber 201 through the conduit 202 back to the pump 192, in order to be again placed under pressure by the pump.

The entire heat storage system is operated so that one or other part of the heat stores 110 and 110' is always being heated whilst the rest of the heat stores gives up its heat to the compressed air to be heated. After the change-over, the previously heated heat store gives up its heat to the compressed air whilst the heat stores previously cooled by the compressed air are heated up. In this way the heat exchanger 105 in which the combustible gas is pre-heated always operates in the same way. With this type of operation the compressed air in the heat stores 110 will be heated very much higher, for example to 1100° C. than in the heat stores 110' in which the air is heated to a less degree, for example only to 600° to 650° C. If for heating the compressed air to the higher temperature double as much heat storage 110 is provided as heat storage 110' for lower temperatures the different amounts of compressed air at the high and lower temperatures will be mixed in the annular conduit 123 and will then flow with an average temperature, of for example 950° C., through the conduit 102 upwardly to the hot air engine.

This heating up of the compressed air to different values is effected so as to produce a particularly advantageous output control of the hot air engine. If the output of the hot air engine is to be reduced the amount of the air sucked in by the air compressor can be throttled in known manner. In this way the weight of the air compressed thereby as well as the pressure of compression is reduced. Instead of throttling the air sucked in by the air compressor the speed of rotation of the air compressor can also be reduced in also known manner which also causes the weight of air and the compression pressure to fall. Further, in each of the two above cases the amount of the combustible gas which is supplied to the heat-exchanger 105 may be reduced, for example by throttling the amount of gas sucked in by the fan which conveys the combustible gas. Nevertheless the weight of the combustible gas should not be reduced in the same ratio as the weight of the circulated compressed air, but to a somewhat greater extent if, as is desirable, the same exhaust air temperature in the conduit 103 should be produced as on full load, since due to the smaller compressed air pressure the expansion ratio for the hot air engine has been reduced.

Corresponding to the smaller expansion ratio and the smaller supply of fuel, the air temperature in the conduit 102 leading to the power engine should be lowered. This is effected by causing not all the heat stores 110 and 110' to be traversed in the same ratio with smaller amounts of air and gas but primarily those amounts of heat delivering exhaust air and heat absorbing compressed air will be reduced which are conveyed through the heat stores 110 having combustion chambers and further to about the same degree as the amount of reduction of the combustile gas. In this way the temperature to which the heat storage material of the heat stores 110 is heated up remains substantially the same, that is, for example 1100° C.

Further, after the change-over an amount of compressed air proportioned according to the smaller amount of the heating-up gas will be led through this heat-exchanger. In this way the amount of compressed air which is heated to the higher temperature of, for example 1100° C. is much smaller in proportion to the amount of compressed air heated to a less degree in the heat store 110' than at full load. This results in a correspondingly lower mixture temperature being produced for the compressed air supplied through the conduit 102 to the hot air engine.

The purpose of this control is to maintain the temperature conditions of the heat storage material of the heat store at the same value even at partial load as at full load, although the compressed air passing to the hot air engine has a lower temperature. This is of great importance in order to allow a hot air engine which has operated for a long time at partial load to be brought rapidly again to full load. If the temperature conditions of the heat storage mass were to vary with the load, a certain period would always elapse before the heat storage material had adapted itself to the new conditions. This would not only cause a delay in the output regulation, but also with the reduction of the output above all compressed air of lower pressure than at full load, but still with the same temperature as at full load, would pass into the hot air engine. Those engine members which would come in contact with expanded air of higher temperature would thus be exposed to harmful influences.

The above-described regulation may be effected with each heat store by a device which is illustrated in Fig. 13. For moving the controlling slide valves 116 there is provided a power cylinder 132 having a piston 133. The two ends of the cylinder 132 are connected by conduits 134 and 135 with a control chamber 136 in which is located a control slide valve 139 which is pressed upwardly by a spring 137 against the end of a lever 138. The other end of the double-armed lever 138 bears through a roller 140 against a cam 141 which is slowly rotated by a driving member, for once per minute. The cams 141 for all the nine heat stores are arranged in succession on a common shaft and the nine respective control valves 139 are contained in a common control chamber 136. The cams are relatively displaced in the direction of rotation so that the heat stores are changed over in succession at the same intervals.

The rotation of the shaft on which the cams are mounted may be effected by an electric driving motor 142 which also drives a pressure oil pump 143 with which it is preferably directly coupled. For driving the cams there are inserted between the shaft of the motor 142 and the shaft of the cams 141, for example two worm drives 144 and 145. The pressure oil pump circulates the regulating pressure oil through conduit 143a from the chamber 146 which is not under pressure into the conduit 147a which is connected to the air chamber 147, and which is also connected with the annular chamber 148 with the control slide valve 139 and through a safety valve 149 with the chamber 146.

By the action of the rotating cams 141 and the springs 137 the control slide valve 139 is brought by means of the lever 138 during each half-rotation of the cam 141 alternately into the upper and lower positions. Thus the oil stream passing through the conduits 134 and 135 is changed over each time, and thus causes the piston 133 and therewith the slide valve 116 to be moved upwardly or downwardly and to remain in the final position until the next changeover is effected.

The final position of the piston 133 and of the slide valve 116 is not always the same, however, in the stores 110, which have the combustion chamber, but is determined by a stepped control block 150, against which bear the abutments 152 and 153, rigidly connected with the valve rod 151. These abutments are adjustable on the valve rod 151 as regards their position, as is shown in Figs. 16, 17 and 18.

The position of the adjusting wedge 150 displaceable in the horizontal direction is determined firstly by an adjustable spring 154 and secondly by a piston 155 loaded by the compressed working medium. At full load of the hot air engine the compressed working medium as already abovementioned is at maximum pressure and thus moves the piston 155 and therewith the regulating wedge 150 completely to the left. Thus the piston 133 and the slide valve 116 can make their maximum stroke and, therefore, the slide valve 116 wholly uncovers the openings controlled by it for the cooled exhaust air and the compressed air to be heated.

When at partial load the pressure of the working air diminishes, the piston 155 and the control wedge 150 are pressed further to the right so that the stroke of the piston 133 and of the slide valves 116 becomes smaller since the abutments 152 and 153 bear against the control wedge 150. The more the pressure of the working air decreases with reduced output of the hot air machine the more will the controlling wedge 150 be displaced to the right and in consequence the smaller will be the stroke of the slide valve 116 and the smaller the size of the openings uncovered by the same.

The heat stores 110′ without combustion chambers are not provided with this device for controlling the stroke of the slide valve 116. In these heat stores 110′ the stroke of the slide valve is always a maximum.

The valve 108, which should be opened only when the slide valve is in its upper position, may be moved automatically during the last part of the stroke of the slide valve 116 by the hollow slide valve rod 151 which is closed at the bottom as shown in Fig. 13. In order that the heat stores 110 shall maintain the same operating temperatures also with smaller loads thermostats 165 are provided (Fig. 11) which are located in the hottest parts of the heat stores 110 and which act on controlling valves 164, as is shown in Fig. 16, by which the supply of combustible gas is adjusted so that the temperature of the heat store at the location of the thermostats and thus also at other points remains the same with all loads.

In order to ensure the ready operation of the heat storage system operating at high temperatures certain other devices are provided.

In the exhaust air conduits 107 leading to the heat stores slide valves 162 (Fig. 11) are provided and in the exhaust air conduits 118 through which the cooled exhaust air passes into the annular space 119 slide valves 163 are arranged, which may be closed by hand to cut off flow through the respective conduits. The valve 162 (or 163) is shown more in detail in Fig. 19. It includes a valve member 162a slidably mounted on a seat 162b. In the position shown, the valve is open so as to permit flow through conduit 107. Secured to the valve member is a threaded stem 162c engaging a spider 162d and having a hand wheel 162e. Thus, rotation of the hand wheel in the proper direction causes the stem to advance to the left, as viewed in Fig. 19, to cause the valve member to enter the conduit 107 and to interrupt flow therethrough. Care must be taken that the conduits 111 for the combustible gas can be shut off by hand, for example by means of valves 164, which are normally controlled during operation by thermostats. In this way during operation each of the heat stores 110 together with its respective control members can be removed and replaced by a reserve heat store. During this time of exchange normal operation will be maintained by the remaining heat stores.

In those cases where a gaseous fuel difficult to ignite is utilised, it is advisable as shown in Fig. 15 to cause the same to flow, before mixing with the combustion air in the space 109, firstly to the annular space 125 then through the channels 170 into an annular space 171 enclosed by highly heated walls, where its temperature will be further increased. With this higher temperature the gaseous fuel then flows through the channels 126 which are circumferentially displaced relatively to the channels 170 into the chamber 109 where it is mixed with combustion air.

Instead of the heat stores 110 and 110′ being arranged around the exhaust air conduit 103 in the form of a circular ring, the rim if desirable in view of space conditions may also be non-circular for example the same may be oval.

The invention can be applied to all kinds of power engines, for example reciprocating engines or turbines.

What I claim is:

1. In a system for producing power, a compressor for compressing a gaseous working medium, means for heating the compressed gas, a gas expansion engine connected so as to be supplied with hot gas from said means, a combustion chamber connected to receive gas after expansion in said engine, means for supplying fuel to said chamber, said heating means including two sections, each section having a plurality of heat storing elements, means for alternately admitting products of combustion and compressed gas to each of the elements of one section, means for alternately admitting compressed gas and a gas having a lower temperature than said products of combustion to each element of the other section, and means to mix in adjustable proportions the compressed gases which have been heated to different temperatures in the two sections to provide the supply of working medium for said engine.

2. In a system for producing power, a compressor for compressing a gaseous working medium, means for heating the compressed gas, a gas expansion engine connected so as to be supplied with hot gas from said means, a combustion chamber connected to receive gas after expansion in said engine, means for supplying fuel to said chamber, said heating means including two sections, each section having a plurality of heat storing elements, means for alternately admitting products of combustion and compressed gas to each of the elements of one section, means for alternately admitting compressed gas and gas discharge from said engine to said element of the other section, and means to mix in adjustable proportions the compressed gases which have been heated to different temperatures in the two sections, to provide the supply of working medium for said engine.

3. In a system for producing power, a compressor for compressing a gaseous working medium, means for heating the compressed gas, a gas expansion engine connected so as to be supplied with hot gas furnished from said means, said heating means including two sections, each section having a plurality of heat storing elements, means for alternately admitting compressed gas and gas discharged from said engine to each element of one of said sections, a separate combustion chamber connected to each of the elements of the other section, means for supplying fuel to said combustion chambers, means for alternately admitting compressed gas and products of combustion from the respective heating chamber to each of the elements of the other section, and means to mix in adjustable proportions the compressed gas from the two sections to provide the supply of working medium for said engine.

4. In a system for producing power, a compressor for compressing a gaseous working medium, means for heating the compressed gas, a gas expansion engine connected so as to be supplied with hot gas furnished from said means, said heating means including two sections, each section having a plurality of heat storing elements, means for alternately admitting compressed gas and gas discharge from said engine to each element of one of said sections, a combustion chamber disposed within each of the elements of the other section, means for supplying fuel to said combustion chambers, means for alternately admitting compressed gas and products of combustion from the respective combustion chambers to each of the elements of said other section, and means to mix in adjustable proportions the compressed gas from the two sections to provide the supply of working medium for said engine.

5. In a system for producing power, a compressor for compressing a gaseous working medium, means for heating the compressed gas, a gas expansion engine, a supply conduit for conveying gas from said means to said engine, an exhaust conduit for said engine, said heating means including a plurality of heat storing elements arranged around said exhaust conduit, a combustion chamber in each of certain of said elements, means for supplying fuel to said combustion chambers, radial pipes connecting said conduit to the lower end of each of said elements, conduit means for connecting the upper ends of said elements with said supply conduit, and valve means in said conduit means.

6. In a system for producing power, a compressor for compressing a gaseous working medium, means for heating the compressed gas, a gas expansion engine connected so as to be supplied with hot gas from said means, a combustion chamber connected to receive gas after expansion in said engine, means for supplying fuel to said chamber, said heating means including two sections, each section having a plurality of heat storing elements, means for alternately admitting compressed gas and exhaust gas from said engine to each element of one of said sections, means for alternately admitting compressed gas and products of combustion from the combustion chamber to each of the elements of the other section, means to mix the compressed gas from the two sections to provide the supply of working medium for said engine, means for regulating the pressure of said supply, and means for varying the quantities of compressed gas and products of combustion admitted to said other section with respect to the quantities of compressed gas and exhaust gas admitted to said one of said sections.

7. In a system for producing power, a compressor for compressing a gaseous working medium, means for heating the compressed gas, a gas expansion engine connected so as to be supplied with hot gas from said means, a combustion chamber connected to receive gas after expansion in said engine, means for supplying fuel to said chamber, said heating means including two sections, each section having a plurality of heat storing elements, means for alternately admitting compressed gas and exhaust gas from said engine to each element of one of said sections, means for alternately admitting compressed gas and products of combustion from the combustion chamber to each of the elements of the other section, means to mix the compressed gas from the two sections to provide the supply of working medium for said engine, means for regulating the pressure of said supply, means for varying the quantities of compressed gas and products of combustion admitted to said other section with respect to the quantities of compressed gas and exhaust gas admitted to said one of said sections, and means for varying the relative quantities of products of combustion and compressed gas supplied to said other section so as to maintain substantially constant the temperature of the elements thereof at different engine loads.

8. In a system for producing power, a compressor for compressing a gaseous working medium, means for heating the compressed gas, a gas expansion engine connected so as to be supplied with hot gas from said means, a combustion chamber connected to receive gas after expansion in said engine, means for supplying fuel to said chamber, said heating means including two sections, each section having a plurality of heat storing elements, means for alternately admitting compressed gas and exhaust gas from said engine to each element of one of said sections, means for alternately admitting compressed gas and products of combustion from the combustion chamber to each of the elements of the other section, means to mix the compressed gas from the two sections to provide the supply of working medium for said engine, means for regulating the pressure of said supply, and means for varying the quantity of exhaust gas admitted to said combustion chamber and the quantity of compressed gas admitted to said other section with respect to the quantities of compressed gas and exhaust gas admitted to said one of said sections.

MICHAEL MARTINKA.